(12) United States Patent
Futral

(10) Patent No.: US 6,747,949 B1
(45) Date of Patent: Jun. 8, 2004

(54) REGISTER BASED REMOTE DATA FLOW CONTROL

(75) Inventor: William T. Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,236

(22) Filed: Dec. 16, 1999

Related U.S. Application Data

(60) Provisional application No. 60/135,259, filed on May 21, 1999.

(51) Int. Cl.[7] ............................................. H04L 12/56
(52) U.S. Cl. ...................................... 370/231; 370/463
(58) Field of Search ............................... 370/231, 232, 370/235, 463, 230; 709/224, 232

(56) References Cited

U.S. PATENT DOCUMENTS

| | | | |
|---|---|---|---|
| 5,208,810 A | | 5/1993 | Park |
| 5,475,433 A | | 12/1995 | Jeong |
| 5,515,359 A | * | 5/1996 | Zheng |
| 5,528,591 A | * | 6/1996 | Lauer |
| 5,550,957 A | | 8/1996 | Davidson, Jr. et al. |
| 5,633,867 A | * | 5/1997 | Ben-num et al. ............ 370/399 |
| 5,633,870 A | | 5/1997 | Gaytan et al. |
| 5,777,624 A | | 7/1998 | Munson |
| 5,825,748 A | * | 10/1998 | Barkey et al. ............... 370/236 |
| 5,937,436 A | | 8/1999 | Watkins |
| 6,112,263 A | | 8/2000 | Futral |
| 6,125,433 A | | 9/2000 | Horstmann et al. |
| 6,243,358 B1 | * | 6/2001 | Monin ......................... 370/229 |
| 6,347,337 B1 | * | 2/2002 | Shah et al. ................... 709/224 |
| 6,594,701 B1 | * | 7/2003 | Forin .......................... 709/232 |

* cited by examiner

Primary Examiner—Kenneth Vanderpuye
(74) Attorney, Agent, or Firm—Christopher K. Gagne

(57) ABSTRACT

In a method according to an example embodiment of the invention, a data packet is transferred from an I/O node to a host across a channel-based switching fabric interconnect. The method stores a value in a register in the I/O node which is indicative of a number of send credits available to the I/O node. The I/O node keeps a count of the number of data transfers. It is then determined from the value of the register whether or not a sufficient number of send credits is available to the I/O node for the data to be transferred by comparing it with the count of previous data transfers. If a sufficient number of send credits is available to the I/O node, it promptly transfers the data to the host over the channel-based switching fabric interconnect. If a sufficient number of send credits is not available to the I/O node, it waits for the host to update the value stored in the register before transferring data.

9 Claims, 3 Drawing Sheets

FIG. 2   NGIO/VI ARCHITECTURAL MODEL

REGISTER BASED REMOTE DATA FLOW CONTROL

This application claims the priority of Provisional Application Serial No. 60/135,259, filed on May 21, 1999.

BACKGROUND

1. Field of the Invention

The invention relates generally to methods and apparatus for data communications across a network. In particular, the invention relates to methods and apparatus for register based remote data flow control over a channel-based switching fabric interconnect or the like.

2. Description of the Related Art

Conventionally, an Input/Output (I/O) node functioning as an intermediary between a host computer and a Local Area Network (LAN) consists of a bus master network interface card (NIC). This process is shown generally in FIG. 1. The I/O controller in the NIC is provided with specific information (i.e., descriptor or memory token) about each buffer in a list of buffers set up and maintained in the host. Every time the NIC receives one or more packets from the LAN (step 1), it reads the buffer list (step 2) and uses a Direct Memory Access (DMA) write operation across the bus to put the packet(s) into the next receive buffer(s) on the list (step 3) and send a notification of the placement of the packet(s) in the buffer(s) to the host (step 4). When the notification is received and processed, either the buffer(s) is emptied or a driver allocates a number of buffers (i.e., by placing another buffer(s) at the end of the list of buffers) in memory and sends a notification to the NIC of the information identifying each of the buffers (step 5). The I/O controller of the NIC must continually read the buffer list and manage the information about the pool of host buffers in order to be able to write data into the proper buffer as LAN packets are received.

This process is shown generally in FIG. 1. There are a number of disadvantages to such a process. First, quite a relatively high amount of overhead information must be transferred on the bus between the host computer and the NIC concerning all of the buffers being set up, emptied and allocated in the host. This information must first be transferred from the host computer to the NIC so that the NIC can maintain and refer to the buffer list when transferring data. Then, when data is transferred to a specific host buffer, that data must be accompanied by information identifying the specific host buffer. The process also increases the number of operations required to transfer data from the NIC to the host computer. In addition to the data transfer operation itself, the NIC must also send a separate notification to the host computer. Since the data transfer operation is a DMA write operation, there is typically a response sent back acknowledging the successful transfer of data. These additional operations also increase the load on the bus connecting the host computer and the NIC.

Such a process also leads to complexity and latencies in the I/O controller of the NIC. The I/O controller must continuously receive and store the information concerning all of the buffers being set up, emptied and allocated in the host. It must also continuously maintain and refer to the list of host buffers in order to determine the proper buffer for data to be transferred into and to attach the corresponding buffer identifying information as overhead in the RDMA write operation transferring the data to that buffer. There can be significant latencies because of the several different operations across the bus and the processing of the buffer information in the I/O controller. Also, the host may be busy processing other tasks when it gets notified of the RDMA write operation and not realize that all of the buffers are full or close to full and that additional buffers need to be posted. In the meantime, the NIC may continue to receive LAN packets. If additional buffers are not posted to the bottom of the list of buffers in time, then all of the buffers may be consumed before the host responds to the notification. In such an event, there is an overflow at the NIC and the LAN packets have to be discarded. While the host node may re-request the lost data, it causes more LAN traffic which in turn increases the latency (and decreases the performance and efficiency) of the NIC when transferring data from the LAN to the host computer. Although additional buffering may be used to offset these effects to some extent, it increases the cost of the NIC, an important consideration in the LAN environment.

SUMMARY

The present invention is directed to methods and apparatus for data communications across a network. In a method according to an example embodiment of the invention, the first step of the method is to store a value in a register in the I/O node which is indicative of a number of send credits available to the I/O node. It is then determined from the value of the register whether or not there is a sufficient number of send credits available to the I/O node for the data to be transferred. If a sufficient number of send credits is available to the I/O node, it promptly transfers the data to the host over the channel-based switching fabric interconnect using send/receive semantics. If a sufficient number of send credits is not available to the I/O node, it waits for the host to update the value stored in the register before transferring the data.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation. The spirit and scope of the present invention being set forth by the appended claims.

The following represents a brief description of the drawings, wherein.

DETAILED DESCRIPTION

With the advent of Next Generation Input/Output (NGIO) architecture, Version 1.0, published Jul. 22, 1999, low latency and high bandwidth channel-based switching fabric interconnects between a host computer and connected devices (including I/O nodes) have become a reality. This has opened new horizons for cluster computing. When implemented in conjunction with the Virtual Interface (VI) model described in the Virtual Interface Architecture Specification, Version 1.0, Dec. 16, 1997 (jointly authored by Intel Corporation, Microsoft Corporation, and Compaq Computer corporation), it is possible for distributed applications to perform low overhead communication using off-the shelf NGIO hardware. However, building high-level applications using primitives provided by the VI model is complex and requires substantial development efforts because the NGIO/VI channel-based switching fabric interconnect conventionally does not provide transport level functionality such as flow control, buffer management, fragmentation and reassembly. Moreover, it is impractical to implement existing network protocols such as the Transmission Control Protocol (TCP) over NGIO/VI because this would result in unnecessary additional overhead. TCP uses a sliding window flow control protocol incorporating sequence numbers, positive acknowledgments, error and duplicate detection, timeouts and retransmission of lost packets, etc., because the underlying network is presumed to be inherently unreliable. In contrast, NGIO/VI channel-based switching fabric interconnects have very low error rates and high reliability levels (delivery and reception) and consider transport errors catastrophic for reliable data delivery mode. Thus, due to the reliable data delivery and reception of NGIO/VI channel-based switched fabric interconnects, the channel connection is broken in the rare case of a lost packet or transport error. Since the virtual interface guarantees that data is delivered exactly once in order, many of the functions performed by TCP to ensure reliability are redundant and would add unnecessary overhead.

Figure 1:
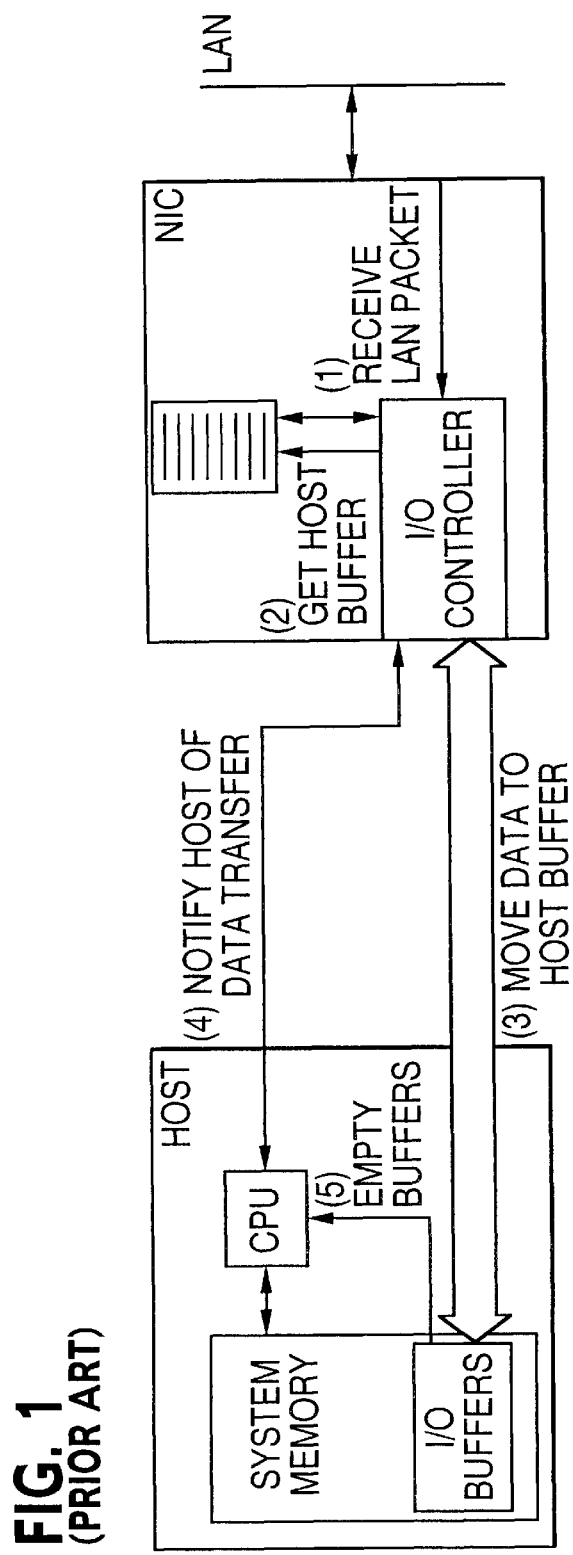
FIG. 1 is a block and flow diagram illustrating a conventional method of transferring data from a network interface card to a host computer.

Even though the host computer and I/O node (and other devices in a computing cluster) can be connected by a NGIO/VI channel-based switching fabric having low latency and high bandwidth, the effective data transfer performance across that switching fabric can be less than optimum because of the lack of flow control and buffer management. This is especially true in computing clusters having an I/O node connected to a local area network (LAN) or other bursty, asynchronous, network where the amount of network traffic can increase or decrease suddenly and/or the data transfers can vary greatly in size and type from large pre-recorded contiguous blocks of image data, such as multimedia data from a CD-ROM, to much smaller heavily fragmented user data. The LAN packets received by the I/O nodes can range in maximum size anywhere from 1500 bytes to over 64000 bytes. In such installations, the manner in which the data packets are buffered and transferred by I/O nodes, host and other elements in the computing cluster can be crucial. Therefore, a need exists for a data communication service over a channel-based switching fabric interconnect that overcomes the disadvantages of conventional PCI compliant LAN NICs discussed above with respect to FIG. 1., yet still provides flow control and buffer management for data transfer between devices of a computing cluster connected by the switching fabric.

The example embodiment of the present invention is applied to a host computer and I/O node of a computing cluster connected to each other over a NGIO/VI channel-based switching fabric. The host computer has a processor, associated system memory with a plurality of allocated and configured buffers, and at least one internal bus connecting these components. It uses the VI Architectural Model which will be described shortly. However, the invention may be implemented in conjunction with other different channel-based switching fabric interconnects having messaging abilities. The example embodiment and other embodiments of the invention may utilize any other architecture and channel-based interconnect which supports both message passing and remote direct memory access, such as the System I/O (SIO) architecture currently being developed as a standardization of NGIO with other architectures. In this patent application, message passing refers to the transfer of data from one end of a channel to the other end wherein the unit receiving the data determines the desired location of the transferred data in its memory. In contrast, remote direct memory access (RDMA) operations allow the initiating end of a data transfer operation to identify the memory location at the receiving end of the channel where the data will be read or stored at the completion of the data transfer operation. According to the present invention, a channel is any means of transferring data, including but not limited to virtual channels, used to transfer data between two endpoints. While the example embodiment is an NGIO implementation and this channel definition is provided in the NGIO specification identified above, the present invention is not so limited. Furthermore, the terminology used in this application is consistent with the aforementioned NGIO specification, and other architectures may use different terminology to describe similar and corresponding aspects. For example, in NGIO, the smallest possible autonomous unit of data is called a cell, and a packet is made up of a number of such cells. In contrast, SIO uses the term "packet" to describe the smallest possible autonomous unit of data instead of "cell" as in NGIO, and uses the term "message" instead of "packet". Furthermore, an SIO packet differs slightly from the corresponding NGIO cell. An NGIO cell has a fixed header size and a fized maximum payload of 256 bytes. An SIO packet has several headers of fixed length, but which are only conditionally present in the packet. Also, the payload of an SIO packet is a minimum of 256 bytes and the maximum payload is variable and negotiable.

For ease of comparison with the conventional method and apparatus discussed above with respect to FIG. 1, the example embodiment of the invention is directed in part to a network interface card (NIC) connected to a local area network. However, such an application is but one of several possible examples of the invention which may, of course, be applied to any I/O node or to any pair of devices where an improvement in transferring data between the devices is desired for whatever reason. An I/O node refers generally to any device or controller that connects a host device or cluster to a network fabric. Although the example embodiment of the invention is implemented and particularly well suited for data from a local area network, the invention is not so limited in its application. Other embodiments of the invention may be implemented for other networks, especially asynchronous, bursty, networks having widely varying and fluctuating data traffic which is not requested by the receiving host computer.

While the embodiments of the invention can be applied to any I/O technology, the traffic studied in local area networks typically has fragmented data in the first 64 bytes of transferred packets. There are inefficiencies in the fragmentation and reassembly because the data cannot be processed at the receiving end until the last cell containing an element of the data is received. Large transfers, in particular, can hold up resources for a long time since there must be a validation that the entire payload is without uncorrectable errors. (Error correction information may be included in the cells in addition to the header and payload.)

Figure 2:
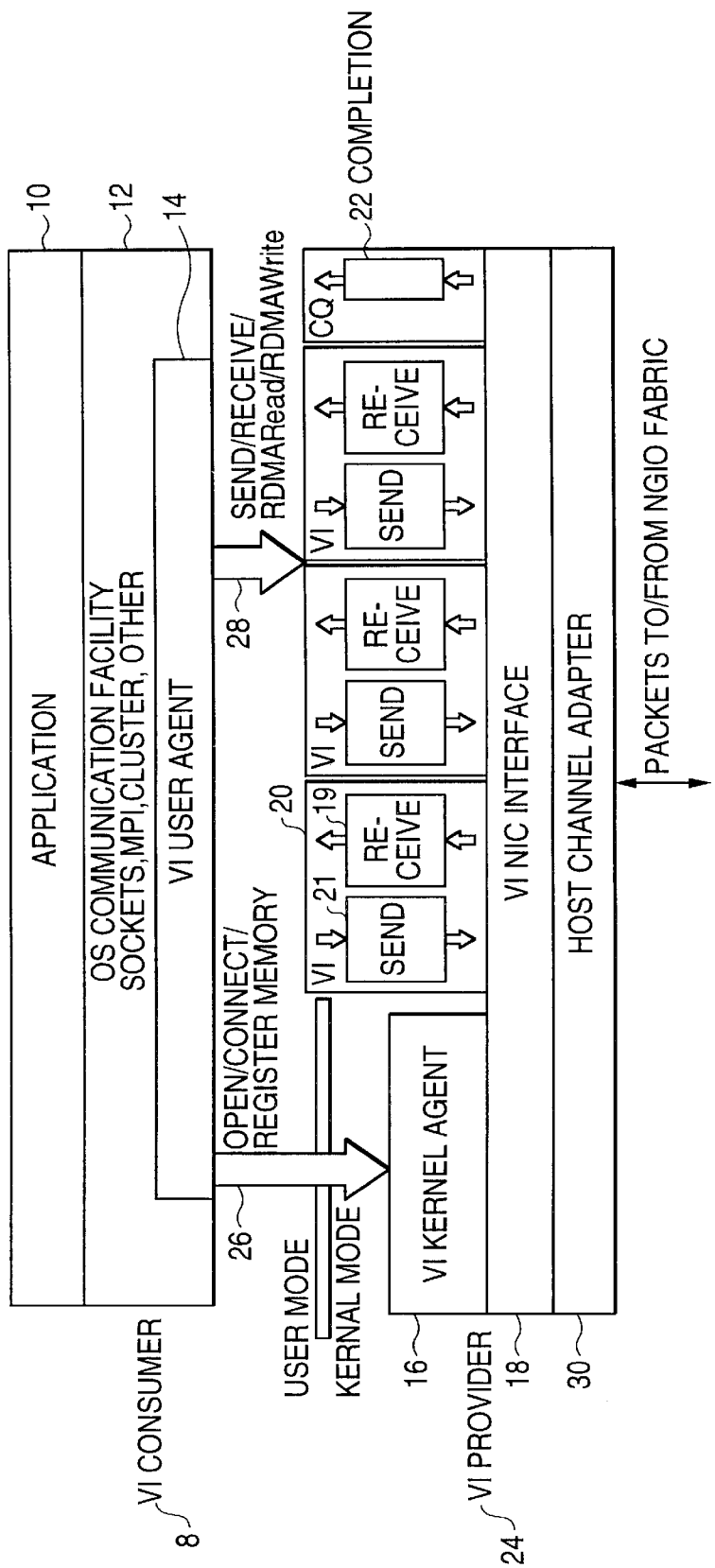
FIG. 2 is a block diagram illustrating the NGIO/VI Architectural model used in an example embodiment of the invention.

As shown in FIG. 2, the VI Architectural model includes a VI consumer 8 and a VI provider 24. A VI consumer 8 is a software process that communicates using a Virtual Interface (VI). The VI consumer 8 typically includes an application program 10, an operating system communications facility 12 (e.g., Sockets, Remote Procedure Call or RPC, MPI) and a VI user agent 14. The VI provider 24 includes the combination of a VI network interface controller (VI NIC) 18 and a VI kernel agent 16. It connects to the NGIO channel-based switching fabric through a channel adapter 30.

VI NIC 18 can directly access memory for data transfer operations with the channel-based switching fabric. There are a pair of work queues, one for send operations (a send queue 21) and one for receive operations (receive queue 19). The work queues store one or more descriptors 23 between the time it is Posted (placed in the queue) and the time it is Done (when the VI NIC has completed processing it). The descriptor 23 is a data structure recognizable by the VI NIC that describes a data movement request, and it includes a list of segments (a control segment, an optional address segment and one or more data segments). The control segment identifies the type of VI NIC data movement operation to be performed and the status of a completed NIC data movement operation. The data segment describes a communications buffer for the data transfer operations. A receive queue 19 contains descriptors that describe where to place incoming data. A send queue 21 contains descriptors that describe the data to be transmitted. A pair of VIs are associated using connection primitives (e.g., VipConnectWait, VipConnectAccept, VipConnectRequest) to allow packets sent at one VI to be received at the other VI. A send doorbell (not shown) and a receive doorbell (not shown) are provided for allowing the VI consumer to notify the VI NIC 18 that work (a descriptor describing a requested data transfer operation) has been placed in the send queue 21 and receive queue 19, respectively.

The VI user agent 14 is a software component that enables an operating system communication facility 12 to utilize a particular VI provider 24. The VI user agent abstracts the details of the underlying VI NIC hardware in accordance with an interface defined by an operating system communication facility 12. The VI user agent includes a library of primitives known as the VI primitives library (VIPL) that provide functions for creating a VI (VipCreateVI), for destroying a VI (VipDestroyVI), for connecting one VI to another VI (e.g., VipConnectWait, VipConnectRequest), for accepting or rejecting a VI connection request (VipConnectAccept or VipConnectReject), for terminating or disconnecting a connection between two VIs (VipDisconnect), to allow a process to register process memory with a VI NIC (VipRegisterMem), to post descriptors (to place a descriptor in a VI work queue using, e.g., VipPostSend, VipPostRecv), etc. Details of the VI primitives (VIPL) are set forth in the VI Architecture Specification, version 1.0, Dec. 16, 1997.

The kernel agent 16 is the privileged part of the operating system, usually a driver supplied by the VI NIC vendor, that performs the setup and resource management functions. These functions include connection setup/teardown, interrupt management and or processing, management of system memory used by the VI NIC and error handling. VI consumers access the kernel agent 16 using the standard operating system mechanisms such as system calls. As shown by arrow 26, the OS communication facility 12 makes system calls to the VI kernel agent 16 to perform several control operations, including to register memory. The VI architecture requires the VI consumer to register memory to be used for data transfer prior to submitting the request for data transfer. The memory regions used by descriptors and data buffers are registered prior to data transfer operations. Memory registration gives a VI NIC a method to translate a virtual address to a physical address. The user receives an opaque memory handle as a result of memory registration. This allows a user to refer to a memory region using a memory handle/virtual address pair without worrying about crossing page boundaries and keeping track of the virtual address to tag mapping. Memory registration enables the VI provider to transfer data directly between the registered buffers of a VI consumer and the channel-based switching fabric.

After registering memory, operating system communication facility 12 can use data transfer primitives of the VIPL library of VI user agent 14 to send and receive data. The VI Architecture defines two types of data transfer operations: 1) send/receive message passing, and 2) RDMA read/write operations. Once a connection is established, the operating system facility 12 posts the application's send and receive requests directly to the send and receive queues. The descriptors are posted (e.g., placed in a work queue) and then a doorbell is rung to notify the NIC that work has been placed in the work queue. The doorbell can be rung (and the VI NIC 18 notified of the work in the queue) without kernel processing. The VI NIC 18 then processes the descriptor by sending or receiving data, and then notifies the VI User Agent 14 of the completed work using the completion queue 22. The VI NIC 18 directly performs the data transfer functions in response to the posted descriptors.

The NGIO/VI Architecture supports an unacknowledged class of service at the NIC level. However, it does not perform other transport level functions, including flow control and buffer management. The VI Architecture Specification, version 1.0, Dec. 16, 1997 states at page 15 that "VI consumers are responsible for managing flow control on a connection." The present invention is designed to provide data flow control over the NGIO/VI architecture or similar architecture An example embodiment of the invention is illustrated by the block diagram in FIG. 3. Host computer 300 has a device driver 301 configured according to the VI model described above, a host processor (CPU) 302 controlling operation of host computer 300 and a system memory 303 coupled to host processor 302 via a host bus. The device driver 301 is coupled to host memory 303 and to host processor 302. It has send/receive descriptors and information for credit based flow control. A host channel adapter (HCA) 304 connects host computer 300 to NGIO switching fabric 305. A portion of system memory 303 is allocated for a plurality of send buffers 303-1 and receive buffers 303-2, which are registered with device driver 301. Once the buffers are registered, device driver 301 can transfer incoming data directly from HCA 304 to a receiver buffer 303-2, and outgoing data can be directly transferred from a send buffer 303-1 to HCA 304. Pools of associated send and receive descriptors are also created and registered in device driver 301.

The switching fabric may contain many different switches SW and redundant paths (not shown) throughout the fabric, such that a plurality of messages can be traveling through the switching fabric at any given time. The switched fabric configuration can contain a plurality of channel adapters, such that there can be a multitude of different messages traveling through the fabric and where all of the various connected devices can continue operating while their messages are traveling through the switching fabric.

I/O node 310 is connected to NGIO switching fabric 305 through target channel adapter (TCA) 311 and to LAN 320 through a conventional LAN receive engine 313. I/O node 310 includes an I/O controller 312 configured according to the VI model described above. According to a feature of the invention, I/O controller 312 includes a credit register 314 storing credits indicating the number of receive buffers available in host computer 300. Device driver 301 is responsible for managing data flow between host computer 300 and I/O node 310 over a channel in NGIO switching fabric 305.

The data transfers are optimized through the device driver 301 and I/O controller 312 at all times. This helps avoid the processor or other elements of the host computer 300 or I/O node 310 from having to expend system resources to accomplish transfer of data blocks since there may be access conflicts with other functions. This method results in an immediate advantage compared to the conventional method shown in FIG. 1 which must have several operations across the fabric, plus a direct memory access (step 2) to place the data in a receive buffer 303-2 of host 300. The host channel adapter 304 and target channel adapter 311 provide all of the scatter/gather capability in the NGIO hardware so that the data is immediately delivered to the target as one contiguous block of data when possible. This minimizes the number of NGIO operations and transaction latency while improving the efficiency of data transfers. If necessary, data can be transferred in one or more data packets. In such an event, the individual data packets are successively transferred according to the same register based flow control scheme as intact data.

Before connection is started between host 300 and I/O node 310, a memory token is transferred to device driver 301. The memory token provides host 300 with access to credit register 314. The memory token can be of any format, e.g., simply a series of bits indicating the address of the remaining left-over data in memory of host computer 300. In the example embodiment, the memory token consists of a virtual address and a memory handle. The virtual address is determined by the I/O controller 312 and when received as part of a RDMA read operation, it is converted by a translation table into a physical address in memory corresponding to credit register 314. The I/O controller 312 may require that the memory handle accompanying the RDMA read operation is the same as that provided by it to ensure that the initiator of the RDMA read operation is entitled to access to the data. In advanced memory handle techniques, the memory handle may also indicate the authorization of the RDMA read operation to access the credit register 314. An important advantage of the example embodiment is that only credit register 314 and a single memory token need to be provided rather than the entire buffer list in the conventional system in FIG. 1.

After the initial RDMA write operation to initialize credit register 314, device driver will initiate multiple subsequent RDMA write operations as necessary to send credits to indicate that receive buffers 303-2 have been emptied or replenished, or that additional receive buffers 303-2 have been allocated in memory 303 of host 300. This process is indicated by the step (1) in FIG. 3. A key feature of this example embodiment is that I/O controller 312 does not have to manage a buffer list or buffer information. Indeed, the send credits in credit register 314 are updated by host 300 without any participation by I/O controller 312. CPU 302 schedules the buffer set up, and corresponding RDMA write operations, at a rate consistent with the resources on host 300. In particular, it schedules the buffer operation, and corresponding RDMA write operations, at the rate that it and I/O node 310 can best consume them thus increasing efficiency without additional demand on I/O node 310. A key advantage of this example embodiment is the efficiency with which the host 300 can use its resources. Host computers, especially servers, typically have many gigabytes of memory and a large amount of data that is being transferred to and from a network. But the amount of memory on an I/O node is relatively small in comparison. The granularity of cells passed back and forth in the NGIO switching fabric allows the example embodiment to optimize the use of receive buffers in the host 300.

Figure 3:
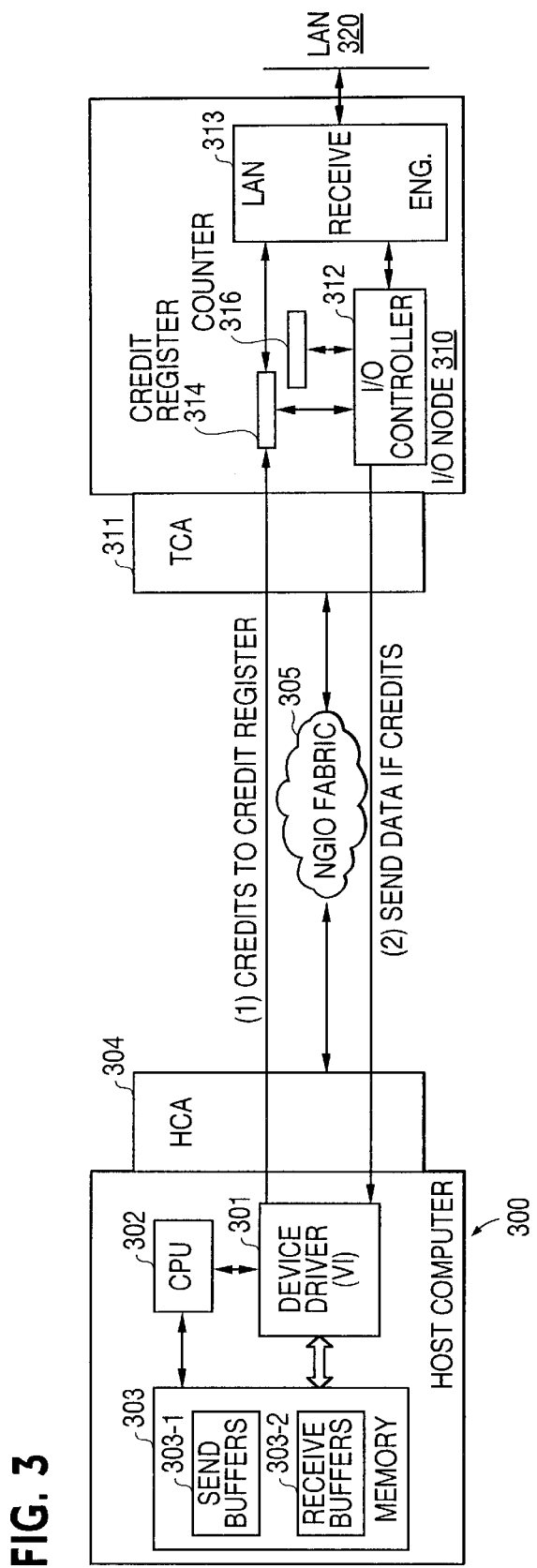
FIG. 3 is a block diagram of the host and I/O node in an example embodiment of the invention.

There may be a series of data transfer operations sending LAN data to host computer 300 from I/O controller 312 according to the example embodiment of the invention as shown by step (2) in FIG. 3. I/O controller 312 counts the number of transfers in counter 316. As mentioned before, the I/O controller 312 can immediately transfer data whenever credit register 314 is greater than counter 316. Even though the data arrives asynchronously and unexpectedly from the LAN, it can be promptly forwarded to host 300 since there is no need for complicated processing. Conversely, the I/O controller 312 stops transferring data when host 300 consumes all of the registered receive buffers 303-2. As a result, data flow control can be simply and remotely established by host 300.

The data flow control also allows corrupted packets to be silently dropped between I/O node 310 and host 300. Although not shown, there is a counter 316 in the I/O node 310 that is incremented every time a LAN packet is sent to the host. The value of that counter is placed inside the data packet that is sent from I/O node 310 to host 300. If a LAN packet is received where the counter is equal to credit register 314, the packet is discarded and not sent. By placing the counter value in the send message itself allows the host to detect when it has missed packets. This increases efficiency and accomodates for the receive buffer 303-2 that did not get consumed by the defective packet. Every time host 300 detects a gap in count values in send messages, it also updates the credit register 314 so that it increases the number of send credits so that the buffer which was not filled can be used for another data packet.

This leads to another important feature of the example embodiment. The data flow control is set up by host channel adapter 304 and target channel adapter 311 over a channel with an unacknowledged class of service. If data packets were corrupted on an acknowledged channel, the data transfers would have to be stopped and restarted to compensate. If all of the data packets are held during that period of time, there would be a tremendous buffer requirement.

The example embodiment uses the messaging ability of the NGIO/VI architecture to send simple send messages over the unacknowledged channel. Consequently, I/O node 310 does not have to know anything about host 300 or the memory address location destination of the data. Instead of doing a RDMA write across the channel-based switching fabric, it uses a send message to a particular queue pair set up by the virtual interface in device driver 301 that has receive buffers 303-2 associated with corresponding receive queues. So as the data comes across the channel-based switching fabric, it goes into those buffers automatically. The only element that needs to know the particulars of the process is the virtual interface in device driver 301, not even the host channel adapter 304 and target channel adapter 311, although the data transfer is fairly simple.

Although an example embodiment, the invention is not limited to the example embodiment illustrated in FIG. 3. Indeed, an advantage of the invention is that it is particularly useful and widely adaptable to any I/O device having latency in data transfer operations. In this way, data transfers can be efficient in both a server that has a great deal of network I/O interfaces and other interfaces. The example embodiments will automatically adapt to transfer characteristics in which large blocks of data are generally asynchronously transferred as well as small blocks of data. Indeed, the example embodiments will adapt to any I/O data interface.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. An input/output (I/O) node configured to communicate with a host across a channel-based switching fabric interconnect, the I/O node comprising:
   a channel adapter connecting the I/O node to the channel-based switching fabric; and
   a virtual interface, including:
      a plurality of send and receive buffers;
      a transport service layer, the transport service layer transferring data between the I/O node and the host;
      an interface user agent coupled to the transport service layer;
      a kernel agent;
      a plurality of work queues; and
      a network interface controller coupled to the kernel agent, the work queues and the channel adapter;
   said virtual interface to issue one or more control commands to the kernel agent to establish a connection between the I/O node and the host across the channel-based switching fabric and to post data transfer requests to the work queues in response to commands from the transport service layer; and
   the network interface controller to process the data transfer requests by transferring data between the send and receive buffers and the channel adapter.

2. The I/O node of claim 1 wherein the virtual interface is in accordance with at least a portion of the Virtual Interface (VI) Architecture.

3. The I/O node of claim 2, wherein the kernel agent comprises a VI kernel agent, and the network interface controller comprises a VI network interface controller.

4. An input/output (I/O) node configured to communicate with a host across a channel-based switching fabric, said I/O node comprising:
   a memory including send and receive application buffers;
   a transport service layer providing for data transfer across the channel-based switching fabric;
   a network interface controller coupled to the network;
   a plurality of work queues coupled to the network interface controller for posting data transfer requests thereto; and
   a user agent coupled to the send and receive buffers and the network interface controller, the user agent posting data transfer requests to the work queues, the network interface controller processing the posted data transfer requests by transferring data between the send and receive buffers and the channel-based switching fabric.

5. A host computer comprising:
   a network interface controller adapter connecting the host computer to a host channel adapter on a channel-based switching fabric interconnect;
   a host processor;
   a memory having registered send and receive buffers; and
   a device driver coupled to the host processor and the memory, and having one or more work queues for posting data transfer requests and a transport service layer providing an end-to-end credit-based flow control across the channel-based switching fabric interconnect according to the status of said registered receive buffers.

6. The host computer recited in claim 5, wherein the device driver comprises a virtual interface, including:
   the transport service layer, the transport service layer transferring data between an input/output I/O node and the host computer;
   an interface user agent coupled to the transport service layer; and
   a kernel agent coupled to the work queues,
   said virtual interface issuing one or more control commands to the kernel agent to establish a connection between the I/O node and the host computer across the channel-based switching fabric and posting data transfer requests to the work queues in response to commands from the transport service layer.

7. The host computer of claim 6, wherein the virtual interface is in accordance with at least a portion of the Virtual Interface (VI) Architecture.

8. The host computer of claim 7, wherein the kernel agent comprises a VI kernel agent, and the network interface controller comprises a VI network interface controller.

9. The host computer of claim 5, wherein the device driver allocates receive buffers in the memory and performs a remote direct memory access (RDMA) write operation to the I/O node to update a register storing send credits of said I/O node.

* * * * *